(12) United States Patent
Yamada et al.

(10) Patent No.: US 8,011,721 B2
(45) Date of Patent: Sep. 6, 2011

(54) VEHICULAR SIDE BODY STRUCTURE

(75) Inventors: Takayuki Yamada, Wako (JP); Yusuke Takayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 141 days.

(21) Appl. No.: 12/608,342

(22) Filed: Oct. 29, 2009

(65) Prior Publication Data

US 2010/0109385 A1    May 6, 2010

(30) Foreign Application Priority Data

Oct. 31, 2008    (JP) ................. 2008-281382

(51) Int. Cl.
 *B60K 37/00*    (2006.01)
(52) U.S. Cl. .................................... 296/209
(58) Field of Classification Search .................. 296/209, 296/187.12, 203.03, 204, 146.6, 146.9; 105/248, 105/404, 416, 420, 418
See application file for complete search history.

(56) References Cited

U.S. PATENT DOCUMENTS

| | | | | |
|---|---|---|---|---|
| 4,826,238 A * | 5/1989 | Misono et al. | ................ | 296/209 |
| 4,973,103 A * | 11/1990 | Imajyo et al. | ............ | 296/203.04 |
| 5,354,115 A * | 10/1994 | Esaki | ....................... | 296/203.03 |
| 5,613,727 A * | 3/1997 | Yamazaki | ................ | 296/203.03 |
| 5,860,694 A * | 1/1999 | Seefried et al. | ........... | 296/203.03 |
| 5,941,597 A * | 8/1999 | Horiuchi et al. | ......... | 296/203.01 |
| 6,193,306 B1 * | 2/2001 | Lee | ............................... | 296/209 |
| 6,322,134 B1 * | 11/2001 | Yang | ........................ | 296/203.02 |
| 6,354,656 B1 * | 3/2002 | Hwang | .......................... | 296/209 |
| 6,619,729 B2 * | 9/2003 | Kimura et al. | ........... | 296/203.03 |
| 7,264,302 B2 * | 9/2007 | Nagashima | .............. | 296/187.12 |
| 2010/0098969 A1 * | 4/2010 | Hashimura et al. | ........... | 428/653 |
| 2010/0225145 A1 * | 9/2010 | Brunner et al. | ........... | 296/187.12 |

FOREIGN PATENT DOCUMENTS

| | | |
|---|---|---|
| FR | 2 890 361 | 3/2007 |
| JP | 07-132860 | 5/1995 |

* cited by examiner

*Primary Examiner* — Kiran B. Patel
(74) *Attorney, Agent, or Firm* — Rankin, Hill & Clark LLP (57) ABSTRACT

Side sill includes a side sill body formed of a steel plate, and a side sill reinforcing member formed by extruding an aluminum alloy and provided inside the side sill body. Reinforcing bracket formed by casting an aluminum alloy covers the outer surface of the side sill body. The reinforcing bracket has protruding portions projecting, through through-holes formed in the side sill body, generally toward the interior of the side sill to be fixed to portions of the side sill reinforcing member, so that the side sill reinforcing member is restrainedly held by the reinforcing bracket.

8 Claims, 8 Drawing Sheets

VEHICULAR SIDE BODY STRUCTURE

FIELD OF THE INVENTION

The present invention relates generally to vehicular side body structures and more particularly to side sills extending in a front-rear direction of the vehicle body along the opposite side edges of a floor panel.

BACKGROUND OF THE INVENTION

In automotive vehicles, side sills are provided to extend along the opposite sides of a floor panel of a passenger compartment in a front-rear direction of the vehicle body, and center and other pillars are fixed at their lower end portions to the side sills. In recent years, there has been developed a vehicular side body structure where a side sill reinforcing member formed by extruding an aluminum alloy is disposed inside a side sill body of a closed cross-sectional shape formed of a steel plate, in order to reduce the overall weight of the side sill and increase the rigidity of the side sill.

Figure 7A:
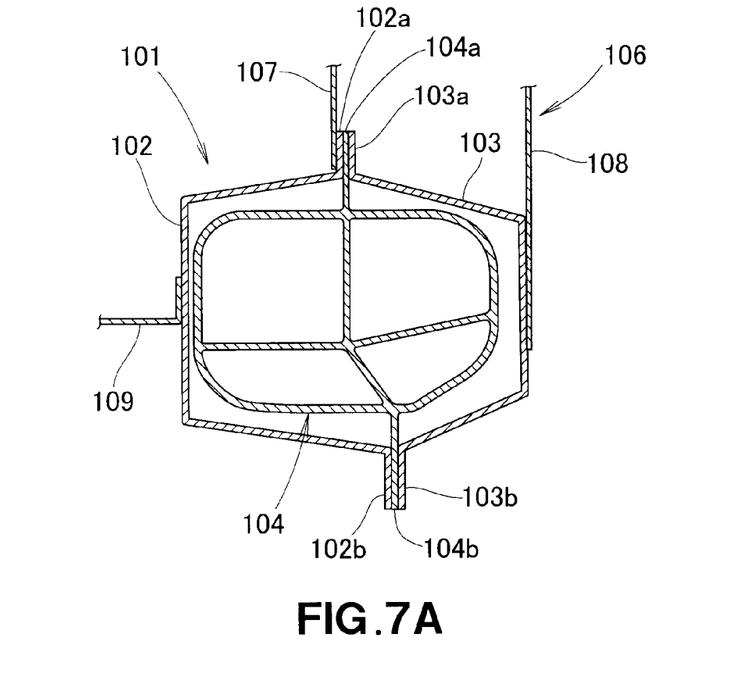
FIGS. 7A and 7B are vertical sectional views showing a conventional vehicular side body structure.
Figure 7B:
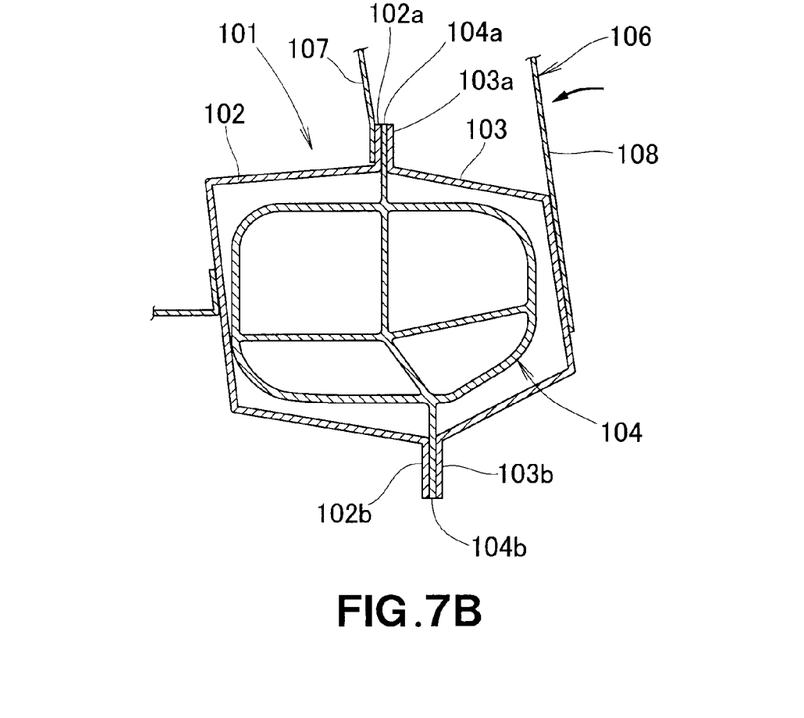

FIGS. 7A and 7B hereof are vertical sectional views showing the vehicular side body structure. As shown in FIG. 7A, the side sill 101 comprises an inner side sill member 102 formed of a steel plate and disposed adjacent to the passenger compartment, an outer side sill member 103 formed of a steel plate and disposed outwardly of (i.e., closer to the outside of the vehicle than) the inner side sill member 102, and a side sill reinforcing member 104 formed by extruding an aluminum alloy and disposed inside the inner side sill member 102 and outer side sill member 103. These inner and outer sill members 102 and 103 and side sill reinforcing member 104 are fixedly joined together at their respective first flanges 102a, 103a and 104a and at their respective second flanges 102b, 103b and 104b.

Center pillar 106 comprises an inner center pillar member 107 disposed adjacent to the passenger compartment, and an outer center pillar member 108 disposed outwardly of the inner center pillar member 107. The inner center pillar member 107 is fixed at its lower end portion to the flange 102a, and the outer center pillar member 108 is fixed at its lower end portion to a side surface of the outer side sill member 103. Reference numeral 109 indicates a floor panel fixed to a side surface of the inner side sill member 102.

As shown in FIG. 7B, if a great external force acts on the center pillar 106 from the side, the center pillar 106 would be deformed to incline as indicated by an arrow, due to which the external force (torsional force) transmits to the inner and outer side sill members 102 and 103 and thus the inner and outer side sill members 102 and 103 would be deformed to incline toward the passenger compartment.

Because the inner side sill member 102, outer side sill member 103 and side sill reinforcing member 104 are fixedly joined together only at their respective first flanges 102a, 103a and 104a and at their respective second flanges 102b, 103b and 104b as noted above, the side sill reinforcing member 104 hardly follows the inclining deformation, due to the external force, of the inner and outer side sill members 102 and 103. Namely, the side sill 101 can not appropriately retain its sectional shape during input thereto of the external force. As a consequence, the side sill reinforcing member 104 can not achieve a sufficient reinforcement effect; in other words, the side sill 101 tends to have a low rigidity against torsional force.

Figure 8:
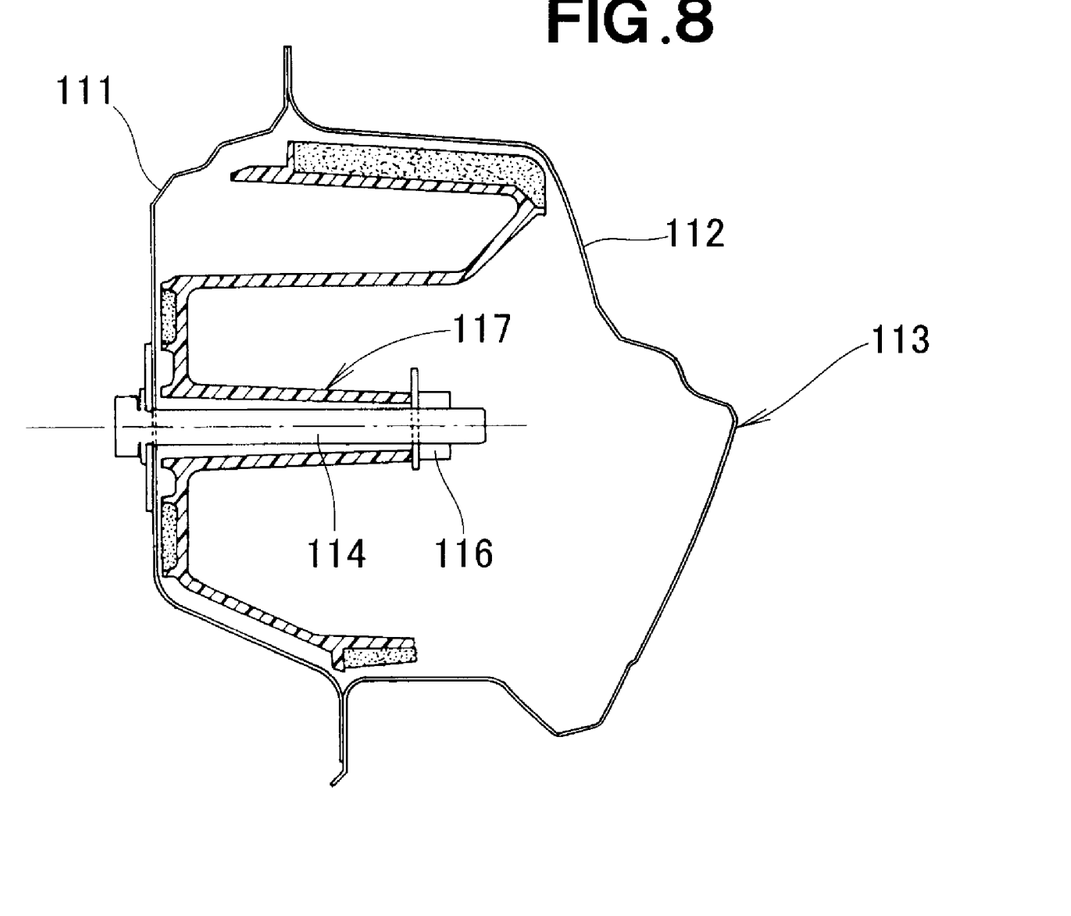
FIG. 8 is a sectional view of another conventionally-known vehicular side body structure.

Further, French Patent Application Laid-Open Publication No. FR 2890361 A1 discloses another vehicular side body structure where a reinforcing member formed by extruding an aluminum alloy is provided inside a side sill. FIG. 8 is a sectional view of the vehicular side body structure disclosed in FR 2890361 A1. In this vehicular side body structure, the side sill 112 comprises an inner panel 111 and an outer panel 112 fixed to the outer end of the inner panel 111, and the reinforcing member 117 formed by extruding an aluminum alloy and having a generally inverted-S sectional shape is disposed inside the side sill 113 and fixed to the inner panel 111 by means of fastener members 114 and 116.

Center pillar is fixed at its lower end portion to the inner and outer panels 111 and 112. If an external object collides against the center pillar from the side, a torsional force would be applied to the side sill 113 due to deformation, toward the passenger compartment, of the center pillar. However, because the reinforcing member 117 of the generally inverted-S sectional shape tends to easily deform at its individual end portions and thus does not have a (sufficient rigidity against the torsional force, it is difficult for the reinforcing member 117 to produce a sufficiently great reactive force to the torsional force. Also, because the reinforcing member 117 does not have a great rigidity against a bending force acting on the side sill 113 from the side, it is difficult for the reinforcing member 117 to produce a sufficiently great reactive force to the bending force.

SUMMARY OF THE INVENTION

In view of the foregoing prior art problems, it is an object of the present invention to provide an improved vehicular side body structure which employs a reinforcing member formed by extruding an aluminum alloy and thereby has an increased rigidity.

In order to accomplish the above-mentioned object, the present invention provides an improved vehicular side body structure, which comprises: a side sill including a side sill body formed of a steel plate, and a side sill reinforcing member formed by extruding an aluminum alloy and disposed inside the side sill body; and a reinforcing bracket formed by casting an aluminum alloy, the reinforcing bracket covering the outer surface of the side sill body and fixedly attached to a portion of the outer surface of the steel side sill body, the steel side sill body having a through-hole formed therein, the reinforcing bracket having a protruding portion projecting through the through-hole of the side sill body to be fixed to a corner portion of the side sill reinforcing member, so that the side sill reinforcing member is restrainedly held by the reinforcing bracket.

Namely, in the present invention, the steel side sill body is covered with the reinforcing bracket that is disposed around the outer surface of the side sill body, formed by casting an aluminum alloy and fixedly attached at a portion to the side sill reinforcing member. Further, the protruding portion is fixed to the corner portion of the side sill reinforcing member via the through-hole formed in the protruding portion of the steel side sill body, so that the side sill reinforcing member is appropriately restrainedly held by the reinforcing bracket. Thus, when a torsional force and/or bending force has acted on the side sill directly or via the center pillar, the torsional force and/or bending force can be transmitted from the reinforcing bracket directly to the side sill reinforcing member; thus, the entire side sill can appropriately receive the torsional force and/or bending force while retaining its sectional shape. In this way, the side sill employing the side sill reinforcing member, formed by extruding an aluminum alloy, and hence the vehicular side body structure can have an increased rigidity against torsion and bending.

Preferably, the protruding portion of the reinforcing bracket extends along the length of the reinforcing bracket. Thus, it is possible to increase a total area over which the protruding portion is fixedly joined with the side sill reinforcing member, so that the reinforcing bracket and the side sill reinforcing member can be fixedly joined with each other with a significantly increased joining strength.

Preferably, the protruding portion of the reinforcing bracket comprises a plurality of protrusions arranged along a length of the reinforcing bracket. In this case too, it is possible to increase the total area over which the protruding portion is fixedly joined with the side sill reinforcing member, so that the reinforcing bracket and the side sill reinforcing member can be fixedly joined with each other with a significantly increased joining strength.

Preferably, the reinforcing bracket has a reinforcing rib provided on the outer surface thereof. With the reinforcing rib, the reinforcing bracket and hence the side sill can have an ever further increased strength and rigidity.

Preferably, the side sill body comprises an inner side sill member and an outer side sill member each formed of a steel plate, and a plurality of the protruding portions are provided on at least portions of the reinforcing bracket adjacent to both of the inner and outer side sill members. With this arrangement, the side sill reinforcing member can be restrainedly held by the portions of the reinforcing bracket adjacent to both of the inner and outer side sill members, which allows a torsional force and/or a bending force from the center pillar to be easily transmitted to the side sill reinforcing member from the portions of the reinforcing bracket adjacent to both of the inner and outer side sill members.

Preferably, the side sill reinforcing member includes a portion having a generally trapezoidal sectional shape.

In a preferred implementation, the side sill reinforcing member includes an upper flange and a lower flange, the upper flange extending upward to be fixedly attached to and between respective upper flanges of the inner and outer side sill members, the lower flange extending downward to be fixedly attached to and between respective lower flanges of the inner and outer side sill members. Thus, the entire side sill can appropriately receive the torsional force and/or bending force.

Preferably, an inner center pillar member is fixed at its lower end portion between opposed upper flanges of the reinforcing bracket together with the respective upper flanges of the inner and outer side sill members and the side sill reinforcing member.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
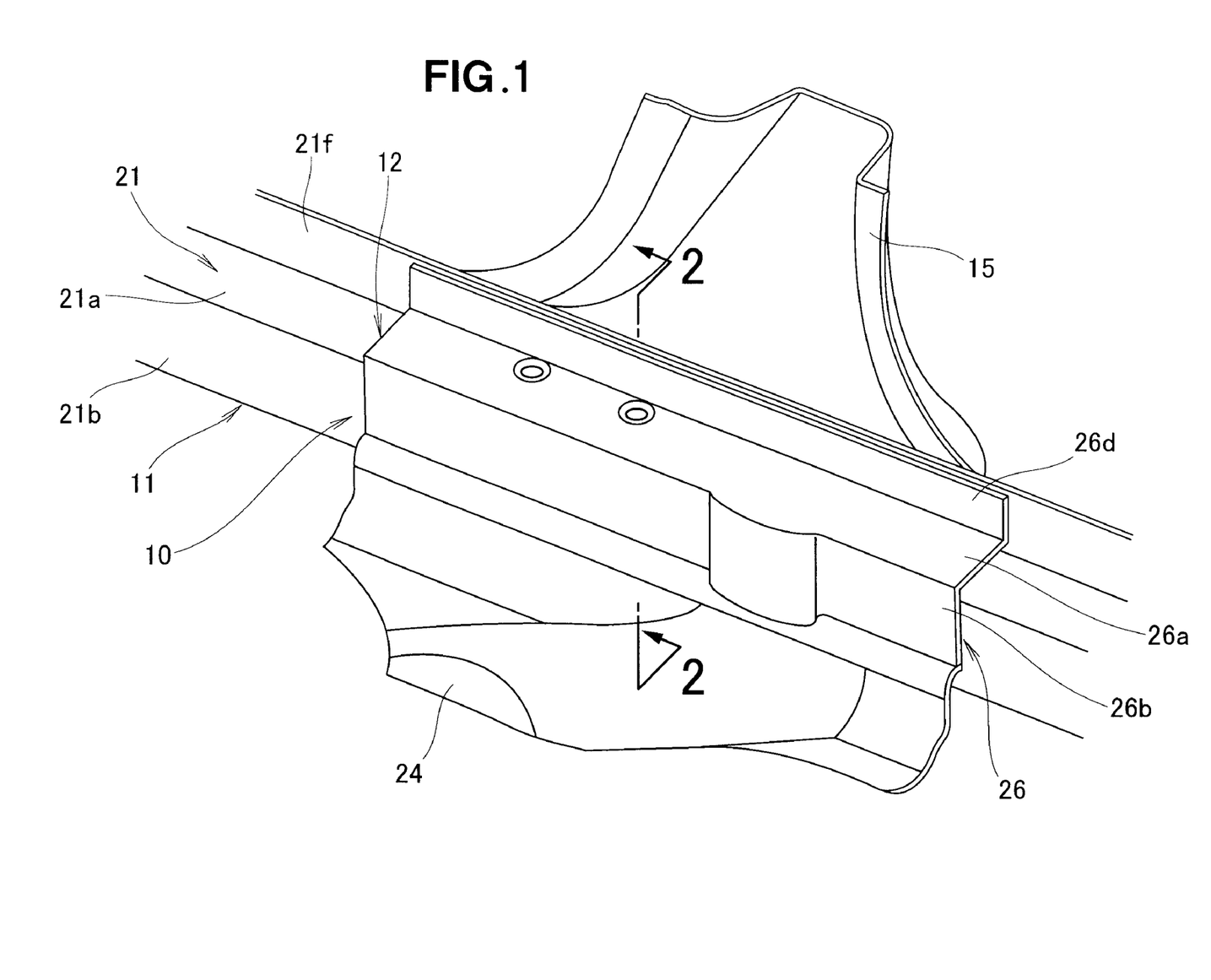
FIG. 1 a perspective view showing principal sections of a vehicular side body structure according to a first embodiment of the present invention.

Reference is now made to FIG. 1 showing in perspective principal sections of a vehicular side body structure according to a first embodiment of the present invention; more specifically, FIG. 1 shows a side sill 10 from inside a passenger compartment.

The side sill 10 comprises a side sill body 11, a reinforcing bracket 12 covering the side sill body 11 to reinforce the side sill body 11, and a side sill reinforcing member (not shown in the FIG. 1) disposed inside the side sill body 11 to reinforce the side sill body 11. Outer center pillar member 15 is fixedly attached to the outer surface of the reinforcing bracket 12 and extends in a vertical direction of the vehicle body.

Inner center pillar member 14 (not shown in the figure) is disposed inwardly of the outer center pillar member 15, and these outer center pillar member 15 and inner center pillar member 14 together constitute a center pillar 17.

Figure 2:
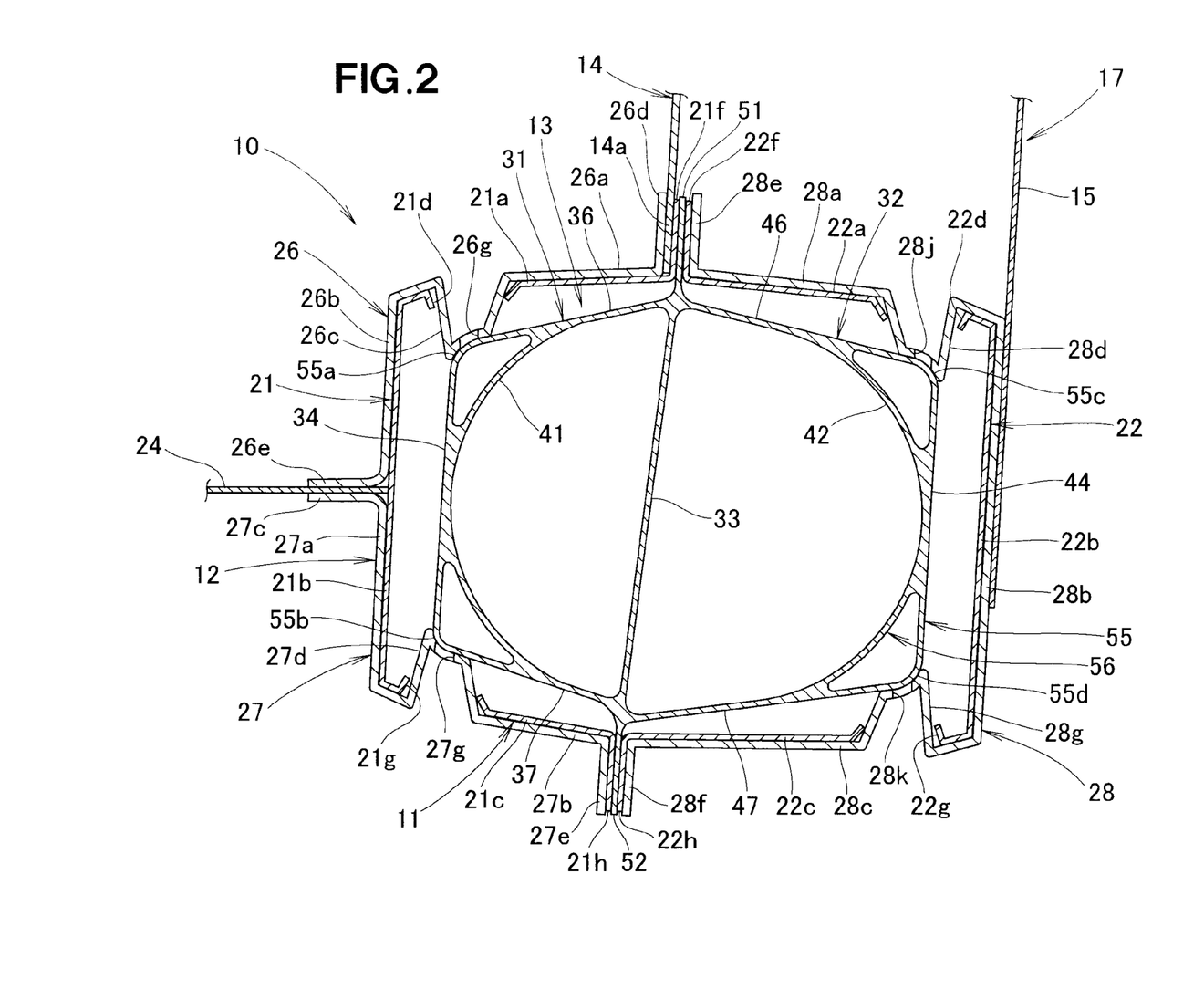
FIG. 2 is a sectional view taken along line 2-2 of FIG. 1.

FIG. 2 is a sectional view taken along the 2-2 line of FIG. 1. As shown in FIG. 2, the side sill 10 includes: the side sill body 11 formed of two steel plates; the reinforcing bracket 12 comprising three bracket members mounted on and covering the side sill body 11 and having portions extending through the wall of the side sill body 11 generally toward the interior of the side sill body 11; and the side sill reinforcing member 13 disposed inside the side sill body 11 and having portions fixedly attached to the reinforcing bracket 12.

More specifically, the side sill body 11 includes an inner side sill member 21 in the form of a steel plate and disposed adjacent to the passenger compartment, and an outer side sill member 22 in the form of a steel plate and disposed outwardly of the inner side sill member 21 to be located adjacent to the outside of the vehicle.

The inner side sill member 21 integrally has an upper wall 21*a*, an inner wall 21*b* and a lower wall 21*c*. The upper wall 21*a* has an upper flange 21*f* integrally formed thereon to extend upwardly, and the lower wall 21*c* has a lower flange 21*h* integrally formed thereon to extend downwardly.

The upper wall 21*a* has an upper elongated hole 21*d* extending in the front-rear direction of the vehicle body (i.e., direction perpendicular to the sheet of the figure), the inner wall 21*b* has a side edge of a floor panel 24, which is in the form of a steel plate, fixed thereto, and the lower elongated wall 21*c* has a lower hole 21*g* extending in the front-rear direction of the vehicle body.

The outer side sill member 22 integrally has an upper wall 22*a*, an outer wall 22*b* and a lower wall 22*c*. The upper wall 22*a* has an upper flange 22*f* integrally formed thereon to extend upwardly, and the lower wall 22*c* has a lower flange 22*h* integrally formed thereon to extend downwardly.

The upper wall 22*a* has an upper elongated hole 22*d* extending in the front-rear direction of the vehicle body, and the lower wall 22c has a lower elongated hole 22g extending in the front-rear direction of the vehicle body.

The reinforcing bracket 12 comprises the three bracket members: upper inner bracket member 26 put on an upper portion of the inner side sill member 21 and on the upper surface of an side edge portion of the floor panel 24; lower inner bracket member 27 put on a lower portion of the inner side sill member 21 and on the lower surface of the side edge portion of the floor panel 24; and outer bracket member 28 put on the outer side sill member 22. Namely, the floor panel 24 is fixedly attached to and between the inwardly-bent vertically middle flanges 26e and 27c. The above-mentioned upper inner bracket member 26, lower inner bracket member 27 and outer bracket member 28 are each formed by casting an aluminum alloy.

The upper inner bracket member 26 integrally has an upper wall 26a and an inner wall 26b. The upper wall 26a has an upper flange 26d integrally formed thereon to extend upwardly, and the inner wall 26b has an inwardly-bent vertically middle flange 26e integrally formed thereon. Further, the upper wall 26a has an upper, downward protruding portion 26c (hereinafter "upper protruding portion 26c") extending in the front-rear direction of the vehicle body and projecting downwardly through the upper hole 21d of the inner side sill member 21 generally toward the interior of the side sill body 11, i.e. toward the side sill reinforcing member 13.

The lower inner bracket member 27 integrally has an inner wall 27a and a lower wall 27b. The lower wall 27b has a lower flange 27e integrally formed thereon to extend downwardly, and the inner wall 27a has an inwardly-bent vertically middle flange 27c integrally formed thereon to extend inwardly. Further, the lower wall 27b has a lower upward protruding portion 27d (hereinafter "lower protruding portion 27d") extending in the front-rear direction of the vehicle body and projecting upwardly through the lower hole 21g of the inner side sill member 21 generally toward the interior of the side sill body 11, i.e. generally toward the side sill reinforcing member 13.

The outer bracket member 28 integrally has an outer wall 28b and a lower wall 28c. The upper wall 28a has an upper flange 28e integrally formed thereon to extend upwardly, and the lower wall 28c has a lower flange 28f integrally formed thereon to extend downwardly.

Further, the upper wall 28a has an upper, downward protruding portion 28d (hereinafter "upper protruding portion 28d") extending in the front-rear direction of the vehicle body and projecting downwardly through the upper hole 22d of the outer side sill member 22 generally toward the interior of the side sill body 11, i.e. generally toward the side sill reinforcing member 13, and the lower wall 28c has a lower, upward protruding portion 28g (hereinafter "lower protruding portion 28g") extending in the front-rear direction of the vehicle body and projecting upwardly through the upper hole 22g of the outer side sill member 22 generally toward the interior of the side sill body 11, i.e. generally toward the side sill reinforcing member 13.

The side sill reinforcing member 13, which is an integral member formed by extruding an aluminum alloy, integrally includes: a first trapezoidal section 31 formed in a generally trapezoidal sectional shape; a second trapezoidal section 32 of a generally trapezoidal sectional shape connected to the outer end of the first trapezoidal section 31 and sharing a lower base portion 33, functioning as a rib, with the first trapezoidal section 31; a first arcuate section 41 formed in an arcuate sectional shape and inscribed in three other side portions than the lower base portion 33 of the first trapezoidal section 31, i.e. an upper base portion 34 and oblique side portions 36 and 37 extending from opposite sides of the upper base portion 34 of the first trapezoidal section 31; a second arcuate section 42 formed in an arcuate sectional shape and inscribed in three other side portions than the lower base portion 33 of the second trapezoidal section 32, i.e. an upper base portion 44 and oblique side portions 46 and 47 extending from opposite sides of the upper base portion 44 of the second trapezoidal section 42; an upper flange 51 extending upward from the upper end of the lower base portion 33; and a lower flange 52 extending downward from the lower end of the lower base portion 33.

The upper flange 51 of the side sill reinforcing member 13 is fixedly attached to and between the upper flanges 21f and 22f of the inner and outer side sill members 21 and 22, while the lower flange 52 of the side sill reinforcing member 13 is fixedly attached to and between the respective lower flanges 21h and 22h of the inner and outer side sill members 21 and 22.

The inner center pillar member 14 in the form of a steel plate is fixed at its lower end portion 14a to the upper flange 21f of the inner side sill member 21, and the upper flange 26d of the upper inner bracket member 26 is fixedly attached to the lower end portion 14a of the inner center pillar member 14. The upper flange 28e of the outer bracket member 28 is fixedly attached to the upper flange 22f of the outer side sill member 22. Thus, the inner center pillar member 14 is fixed at the lower end portion 14a between the upper flange 26d of the upper inner bracket member 26 and the upper flange 28e of the outer bracket member 28 of the reinforcing bracket 12 together with the upper flanges 21f and 22f of the inner and outer side sill members 21 and 22 and the upper flange 51 of the side sill reinforcing member 13.

The lower flange 27e of the lower inner bracket member 27 is fixedly attached to the lower flange 21h of the inner side sill member 21. The lower flange 28f of the outer bracket member 28 is fixedly attached to the lower flange 22h of the outer side sill member 22. Further, the outer center pillar member 15 is fixedly attached to the outer wall 28b of the outer bracket 28.

The aforementioned inner center pillar member 14 and the outer center pillar member 15 together constitute the center pillar 17.

Further, in the side sill reinforcing member 13, a generally circular section 56 is formed by integrally connecting together, in an annular shape, the first arcuate section 41, part of the oblique side portion 36 integrally continuing from one end of the first arcuate section 41, part of the oblique side portion 37 integrally continuing from the other end of the first arcuate section 41, the second arcuate section 42, part of the oblique side portion 46 integrally continuing from one end of the second arcuate section 42 and part of the oblique side portion 46 integrally continuing from the other end of the second arcuate section 42. The generally circular section 56 is inscribed in a generally hexagonal section 55 that is an example of a polygonal section 55 formed in a polygonal sectional shape by the contours of the first and second trapezoidal sections 31 and 32; alternatively, generally circular section 56 may be circumscribed on the generally circular section 56.

The upper protruding portion 26c of the upper inner bracket member 26 has its distal end portion attached to one end portion of the oblique side portion 36 adjacent to the upper base portion 34. The lower protruding portion 27d of the lower inner bracket member 27 has its distal end portion attached to one end portion of the oblique side portion 37 adjacent to the upper base portion 34. The upper protruding portion 28b of the outer bracket member 28 has its distal end portion attached to one end portion of the oblique side portion 46 adjacent to the upper base portion 44. Further, the lower protruding portion 28g of the outer bracket member 28 has its distal end portion attached to one end portion of the oblique side portion 47 adjacent to the upper base portion 44.

Stated differently, the upper protruding portion 26c of the upper inner bracket member 26 may have its distal end portion attached to a corner portion 55a between the upper base portion 34 and the oblique side portion 36, the lower protruding portion 27d of the lower inner bracket member 27 may have its distal end portion attached to a corner portion 55b between the upper base portion 34 and the oblique side portion 46, the upper protruding portion 28d of the outer bracket member 28 may have its distal end portion attached to a corner portion 55c between the upper base portion 44 and the oblique side portion 46, and the lower protruding portion 28g of the outer bracket member 28 may have its distal end portion attached to a corner portion 55d between the upper base portion 44 and the oblique side portion 47.

The upper protruding portion 26c and the lower protruding portion 27d are each provided to project in generally the same direction as where the upper base portion 34 extend, and the upper protruding portion 28d and the lower protruding portion 28g are each provided to project in generally the same direction as where the upper base portion 44 extend.

For example, the oblique side portions 36, 37, 46 and 47 and the upper protruding portion 26c, lower protruding portion 27d, upper protruding portion 28d and lower protruding portion 28g (or corner portions 55a, 55b, 55c and 55d) are joined with each other in the following manner. Through-holes 26g, 27g, 28j and 28k are formed in distal end portions of the upper protruding portion 26c, lower protruding portion 27d, upper protruding portion 28d and lower protruding portion 28g, respectively, and the peripheral edges of the through-holes 26g, 27g, 28j and 28k and the corresponding oblique side portions 36, 37, 46 and 47 (more specifically, corner portions 55a, 55b, 55c and 55d) are welded together by MIG (Metal Inert Gas) welding.

Namely, as shown in FIG. 2, in the first embodiment of the vehicular side body structure, where the side sill 10 includes the side sill body 11 formed of two steel plates (inner and outer side sill members 21 and 22) and the side sill reinforcing member 13 formed by extruding an aluminum alloy and disposed inside the side sill body 11, the steel side sill body 11 is covered with the reinforcing bracket 12 that is disposed around the outer peripheral surface of the side sill body 11, formed by casting an aluminum alloy and fixedly attached to the steel side sill body 11. Further, the upper protruding portion 26c, lower protruding portion 27d, upper protruding portion 28d and lower protruding portion 28g are fixed to the corner portions 55a, 55b, 55c and 55d of the side sill reinforcing member 13 via the through-holes 26g, 27g, 28j and 28k formed in the distal end portions of the upper protruding portion 26c, lower protruding portion 27d, upper protruding portion 28d and lower protruding portion 28g, respectively, so that the side sill reinforcing member 13 is appropriately restrainedly held by the reinforcing bracket 12. Thus, when a torsional or bending force has acted on the side sill 10 directly or via the center pillar 17, the torsional and/or bending force can be transmitted from the reinforcing bracket 12 directly to the side sill reinforcing member 13; thus, the torsional or bending force can be received by the entire side sill 10. In this way, the side sill 10 employing the side sill reinforcing member 13, formed by extruding an aluminum alloy, and hence the vehicular side body structure can have an increased rigidity against torsion and bending.

Further, with the steel inner center pillar member 14 fixedly attached to and between the flanges of the side sill reinforcing member 13 formed of an aluminum alloy and the upper inner bracket member 26 of the reinforcing bracket 12 formed of an aluminum alloy, joint portions between the center pillar 17 and the side sill 10 and between the can be significantly increased in rigidity; namely, the center pillar 17 and the side sill 10 can be fixedly joined with each other with a significantly increased rigidity.

Figure 3A:
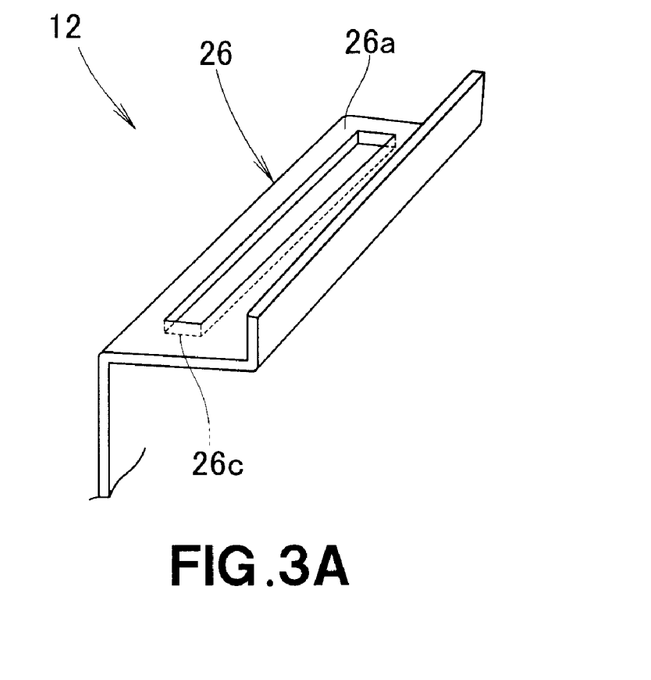
FIG. 3A is a perspective view of a reinforcing bracket in the first embodiment, which particularly shows an upper, downward protruding portion of an upper inner bracket member of a reinforcing bracket.

FIG. 3A is a perspective view of the reinforcing bracket 12, which particularly shows the upper protruding portion 26c of the upper inner bracket member 26. The upper protruding portion 26c is in the form of a single protrusion formed to extend along the length (i.e., in the longitudinal direction) of the upper inner bracket member 26 and projects downwardly from the upper wall 26a generally toward the side sill reinforcing member 13 (see FIG. 2). Note that the other upper protruding portion 28d is constructed in a similar manner to the upper protruding portion 26c, and that each of the lower protruding portions 27d and 28g is also similar in construction to the upper protruding portions 26c and 28d except that it is in the form of an upward protrusion.

Figure 3B:
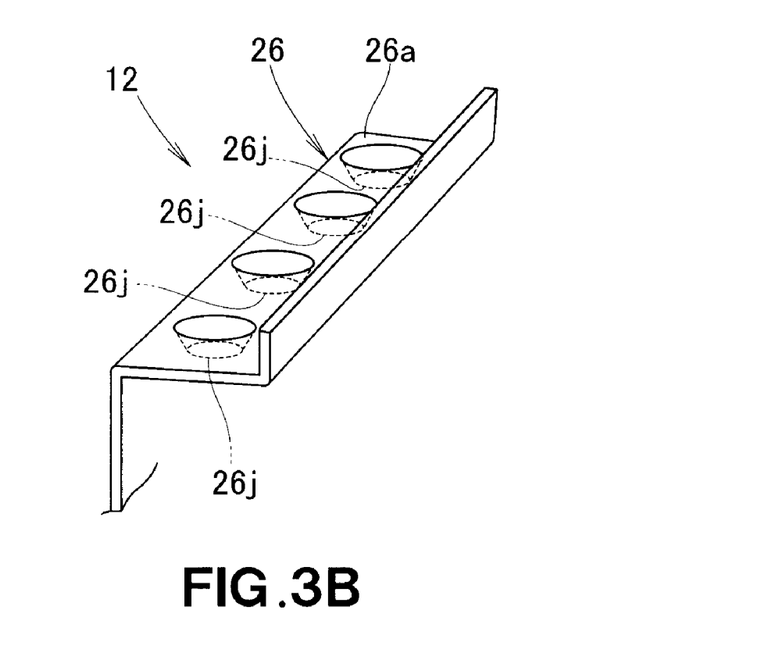
FIG. 3B is a perspective view of another embodiment of the reinforcing bracket.

FIG. 3B is a perspective view of another embodiment of the reinforcing bracket 12, where each of the upper protruding portions 26c and 28d is in the form of a plurality of downward protrusions 26j each projecting upwardly from the upper wall 26a generally toward the side sill reinforcing member 13. The plurality of downward protrusions 26j are arranged along the length (i.e., in the longitudinal direction) of the upper inner bracket member 26. In this case, the other upper protruding portion 28d may be constructed in a similar manner to the upper protruding portion 26c, and each of the lower protruding portions 27d and 28g may be also similar in construction to the upper protruding portions 26c and 28d except that it is in the form of upward protrusions.

With each of the upper protruding portion 26c, lower protruding portion 27d, upper protruding portion 28d and lower protruding portion 28g formed in the reinforcing bracket 12 in the manner as shown in FIGS. 2 and 3A or 3B, it is possible to increase the total area over which the upper protruding portion 26c, lower protruding portion 27d, upper protruding portion 28d and lower protruding portion 28g are fixedly joined with the side sill reinforcing member 13, so that the reinforcing bracket 12 and the side sill reinforcing member 13 can be fixedly joined with each other—the side sill reinforcing member 13 can be restrainedly held by the reinforcing bracket 12—with a significantly increased joining strength. In this way, any torsional and bending forces can be effectively input from the center pillar 17 to the entire side sill 10.

Figure 4:
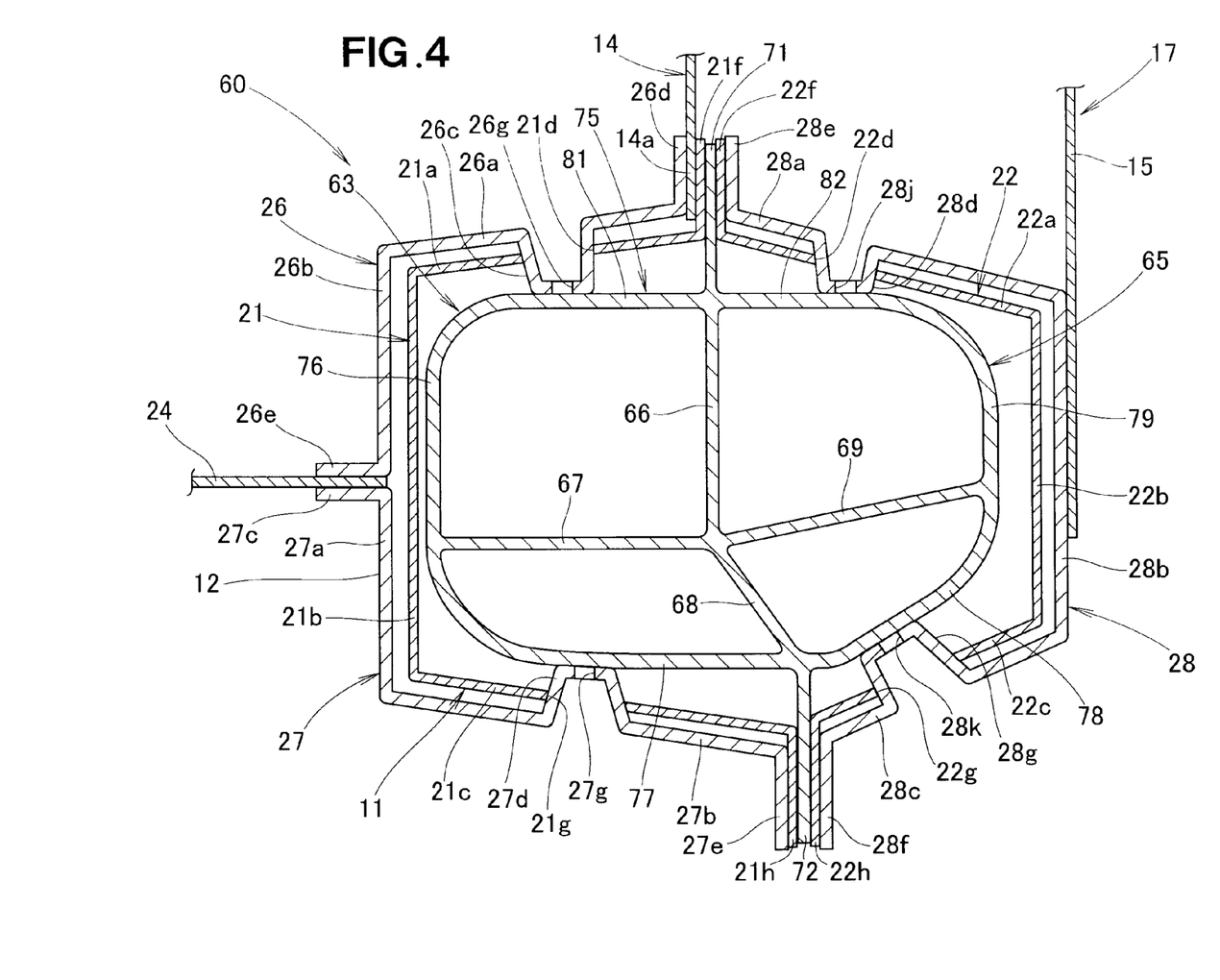
FIG. 4 a sectional view of a vehicular side body structure according to a second embodiment of the present invention.

FIG. 4 a sectional view of a vehicular side body structure according to a second embodiment of the present invention, where similar elements to those in the first embodiment are indicated by the same reference numerals as used for the first embodiment and will not be described here to avoid unnecessary duplication.

In FIG. 4, a side sill 60 comprises a side sill body 11 formed of two steel plates, a reinforcing bracket 12 formed by casting an aluminum alloy, and a side sill reinforcing member 63 disposed inside the side sill body 11 and having portions fixedly attached to the reinforcing bracket 12.

The side sill reinforcing member 63, which is integrally formed by extruding an aluminum alloy, integrally includes: a pentagonal section 65 having a pentagonal sectional shape; a plurality of ribs 66-69 formed inside the pentagonal section 65; an upper flange 71 extending upward from a connection between the pentagonal section 65 and the rib 66; and a lower flange 72 extending downward from a connection between the pentagonal section 65 and the rib 68. The ribs 66-69 are interconnected at their respective interior ends.

The pentagonal section 65 has an upper wall 75, inner wall 76, lower wall 77, slanting wall 78 and outer wall 79 interconnected in a generally oval shape. The rib 66 is integrally connected with the upper wall 75, the rib 67 connected with the inner wall 76, the rib 68 connected with the lower wall 77, and the rib 69 connected with the outer wall 79.

The upper wall 75 comprises an inner upper wall portion 81 located closer to the passenger compartment than the upper flange 71, and an outer upper wall portion 82 located closer to the outside of the vehicle than the upper flange 71.

The upper flange 71 is fixedly attached to and between the upper flanges 21f and 22f of the inner side sill member 21 and outer side sill member 22, and the lower flange 72 is fixedly attached to and between the lower flanges 21h and 22h of the inner side sill member 21 and outer side sill member 22.

The upper protruding portion 26c of the upper inner bracket member 26 is fixedly attached at its distal end portion to the inner upper wall portion 81, the lower protruding portion 27d of the lower inner bracket member 27 is fixedly attached at its distal end portion to the lower wall 77, the lower protruding portion 28g of the outer bracket member 28 is fixedly attached at its distal end portion to the slanting wall 78, and the upper protruding portion 28d of the outer bracket member 28 is fixedly attached at its distal end portion to the outer upper wall portion 82.

For example, the inner upper wall portion 81, lower wall 77, slanting wall 78 and outer upper wall portion 82 and the upper protruding portion 26c, lower protruding portion 27d, lower protruding portion 28g and upper protruding portion 28d are joined with each other in the following manner. Through-holes 26g, 27g, 28k and 28j are formed in the distal end portions of the upper protruding portion 26c, lower protruding portion 27d, lower protruding portion 28g and upper protruding portion 28d and, respectively, and the peripheral edges of the through-holes 26g, 27g, 28k and 28j and the inner upper wall portion 81, lower wall 77, slanting wall 78 and outer upper wall portion 82 are welded together by MIG welding.

Figure 5A:
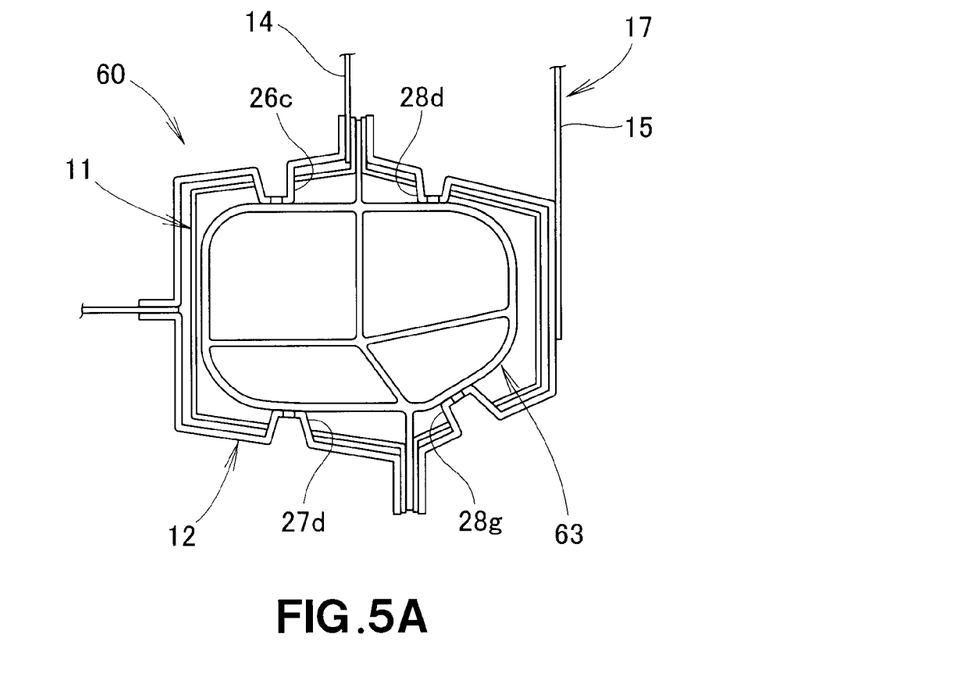
FIGS. 5A and 5B are views explanatory of behavior of the second embodiment.
Figure 5B:
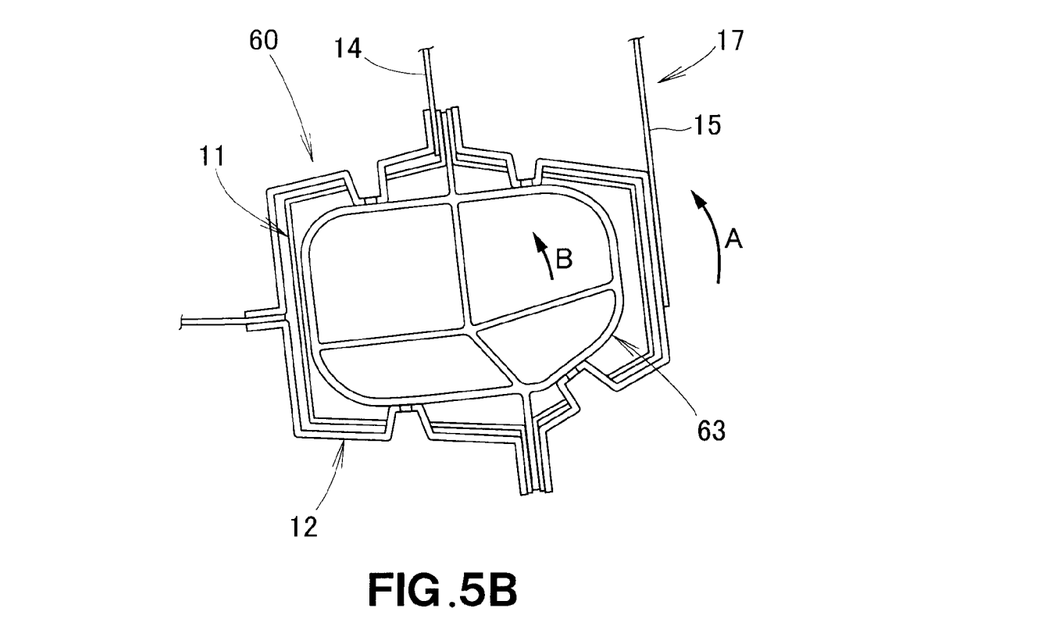

The following describe behavior of the second embodiment of the vehicular side body structure including the above-described side sill 60, with reference to FIGS. 5A and 5B.

FIG. 5A shows a state of the side sill 60 before an external force acts on a side surface of the center pillar 17 fixed to the side sill 60. Referring to FIG. 5B, when an external force (torsional force) has acted on the center pillar 17 from the side, the center pillar 17 is deformed to incline as indicated by arrow A, due to which the external force (torsional force) is applied to the inner side sill member. Thus, the side sill body 11 and the reinforcing bracket 12 are both deformed to incline toward the passenger compartment as indicated by arrow B.

Because the side sill reinforcing member 63 is fixedly joined to the reinforcing bracket 12 at four portions, the side sill reinforcing member 63 inclines together with the reinforcing bracket 12 as the reinforcing bracket 12 inclines; namely, the side sill reinforcing member 63 receives the torsional force acting on the side sill 60. Consequently, the side sill 60 can have an increased rigidity against the torsional force and thus provide a great reactive force.

Also, when an external force (bending force) has acted directly on a side surface of the side sill 60 from the side, this external force transmits from the reinforcing bracket 12 directly to the side sill reinforcing member 63, and thus, the external force can be received by the entire side sill 60, so that the side sill 60 can have an increased rigidity against the bending force and thus provide a great reactive force.

Figure 6:
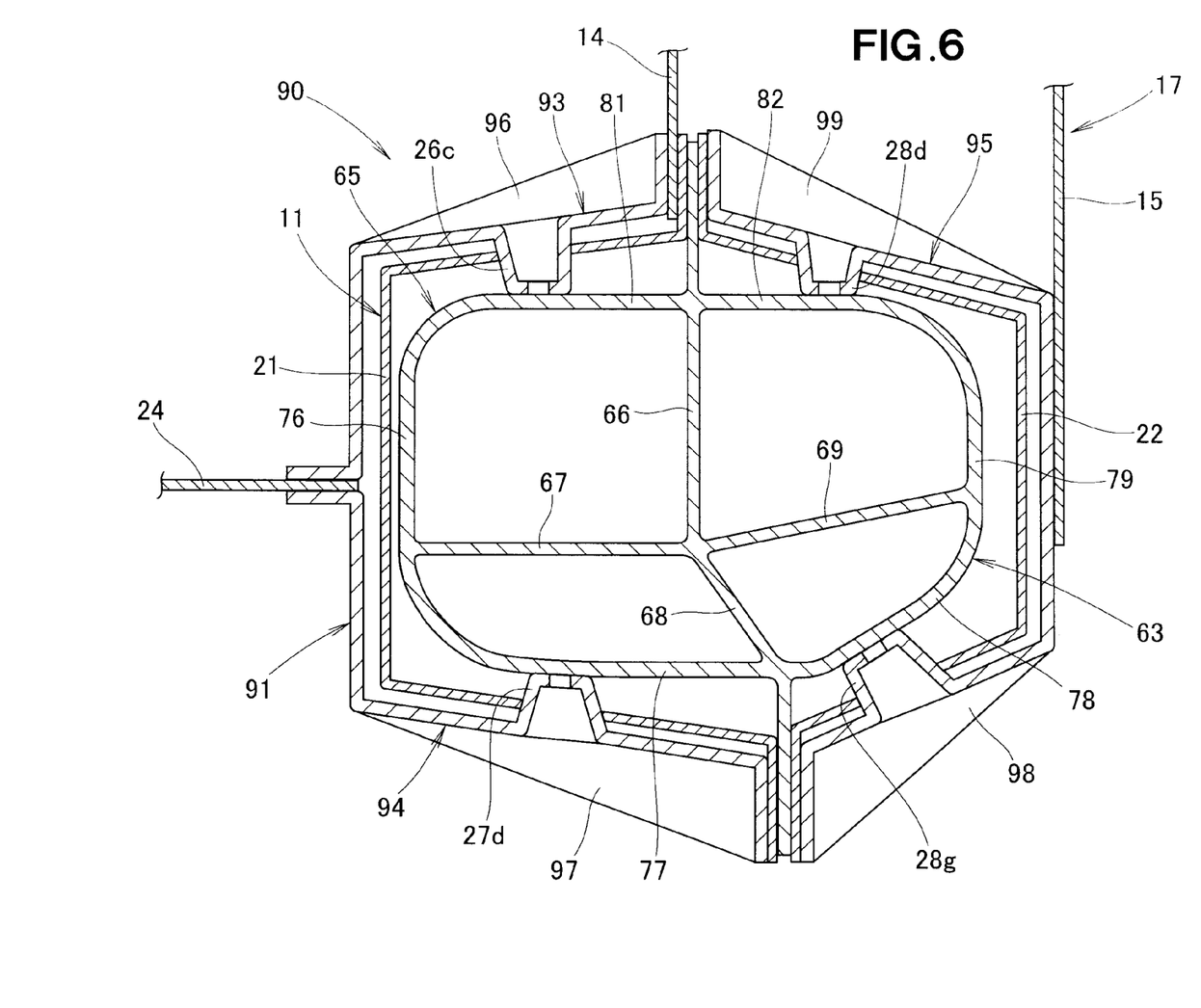
FIG. 6 a sectional view of a vehicular side body structure according to a third embodiment of the present invention.

FIG. 6 a sectional view of a vehicular side body structure according to a third embodiment of the present invention, where similar elements to those in the first embodiment are indicated by the same reference numerals as used for the first embodiment and will not be described here to avoid unnecessary duplication.

Side sill 90 includes: a side sill body 11 formed of two steel plates; a reinforcing bracket 91 formed by casting an aluminum alloy comprising three bracket members mounted on and covering the side sill body 11 and having portions extending through the wall of the side sill body 11 into the side sill body 11; and a side sill reinforcing member 63 formed by extruding an aluminum alloy and disposed inside the side sill body 11 and having portions fixed to the reinforcing bracket 12.

The reinforcing bracket 91 comprises the three bracket members: upper inner bracket member 93; lower inner bracket member 94; and outer bracket member 95. The upper inner bracket member 93, lower inner bracket member 94 and outer bracket member 95 correspond to the upper inner bracket member 26, lower inner bracket member 27 and outer bracket member 28 of FIG. 4 but different from the bracket members 26, 27 and 28 in that reinforcing ribs 96-99 are provided on the respective outer surfaces of the bracket members 93-95. The reinforcing ribs 96-99 project generally orthogonally to the length of the side sill 90. The upper inner bracket member 93, lower inner bracket member 94 and outer bracket member 95 are each formed by casting an aluminum alloy.

With the reinforcing ribs 96-99 provided on the bracket members 93, 94 and 95 of the reinforcing bracket 12, each of the bracket members 93, 94 and 95 can have an even further increased rigidity against bending and torsion, with the result that the reinforcing bracket 91 and hence the side sill 90 can have an even further increased strength and rigidity against bending and torsion.

In the above-described vehicular side body structure of the present invention, where the side sill 10, 60 or 90 includes the steel side body 11 comprising the inner and outer side sill members 21 and 22 and where the upper protruding portions 26c and 28d and the lower protruding portion 27d and 28g are provided at least on both the inner and outer side sill members 21 and 22, the side sill reinforcing member 13 or 63 can be restrainedly held by the reinforcing bracket 12 or 91 at least on the inner and outer side sill members 21 and 22, so that the side sill can effectively receive any torsional and bending forces from the center pillar 17.

Whereas the embodiments of the invention have been described above in relation to the case where the outer bracket member 28 is in the form of a single member, the present invention is not so limited, and the outer bracket member 28 may be in the form of two divided members having the upper protruding portion 28d and the lower protruding portion 28g, respectively.

It should be appreciated that the vehicular side body structure of the present invention is well suited for application to four-wheeled vehicles.

What is claimed is:

1. A vehicular side body structure comprising:
   a side sill including a side sill body formed of a steel plate, and a side sill reinforcing member formed by extruding an aluminum alloy and disposed inside the side sill body; and
   a reinforcing bracket formed by casting an aluminum alloy, the reinforcing bracket covering an outer surface of the side sill body and fixedly attached to a portion of the outer surface of the side sill body,
   the side sill body having a through-hole formed therein, the reinforcing bracket having a protruding portion projecting, through the through-hole of the side sill body, generally toward an interior of the side sill to be fixed to a corner portion of the side sill reinforcing member, so that the side sill reinforcing member is restrainedly held by the reinforcing bracket.

2. The vehicular side body structure of claim 1, wherein the protruding portion of the reinforcing bracket extends along a length of the reinforcing bracket.

3. The vehicular side body structure of claim 1, wherein the protruding portion of the reinforcing bracket comprises a plurality of protrusions arranged along a length of the reinforcing bracket.

4. The vehicular side body structure of claim 1, wherein the reinforcing bracket has a reinforcing rib provided on an outer surface thereof.

5. The vehicular side body structure of claim 1, wherein the side sill body comprises an inner side sill member and an outer side sill member each formed of a steel plate, and a plurality of the protruding portions are provided on at least portions of the reinforcing bracket adjacent to both of the inner and outer side sill members.

6. The vehicular side body structure of claim 1, wherein the side sill reinforcing member includes a portion having a generally trapezoidal sectional shape.

7. The vehicular side body structure of claim 1, wherein the side sill reinforcing member includes an upper flange and a lower flange, the upper flange extending upward to be fixedly attached to and between respective upper flanges of the inner and outer side sill members, the lower flange extending downward to be fixedly attached to and between respective lower flanges of the inner and outer side sill members.

8. The vehicular side body structure of claim 7, wherein an inner center pillar member is fixed at a lower end portion thereof between opposed upper flanges of the reinforcing bracket together with the respective upper flanges of the inner and outer side sill members and the side sill reinforcing member.

* * * * *